United States Patent
Kasboske

(10) Patent No.: US 6,773,148 B2
(45) Date of Patent: Aug. 10, 2004

(54) SYSTEM FOR MOUNTING AN OBJECT ON A MOVING VEHICLE

(76) Inventor: George C. Kasboske, 9040 S. 85th Ave., Hickory Hills, IL (US) 60457

( * ) Notice: Subject to any disclaimer, the term of this patent is extended or adjusted under 35 U.S.C. 154(b) by 8 days.

(21) Appl. No.: 10/095,267

(22) Filed: Mar. 11, 2002

(65) Prior Publication Data

US 2003/0169593 A1 Sep. 11, 2003

(51) Int. Cl.[7] ................................................. B60Q 1/00
(52) U.S. Cl. ..................... 362/493; 362/543; 362/249; 362/250; 362/252; 362/485; 362/496; 362/523; 248/224.41; 248/224.51; 248/307; 248/225.11; 296/21; 410/77
(58) Field of Search ................................ 362/493, 523, 362/249, 250, 252, 543, 549, 496, 485, 545; 248/224.41, 307, 225.11, 224.57; 340/468, 471, 472; 296/21; 410/77

(56) References Cited

U.S. PATENT DOCUMENTS 6,123,441 A * 9/2000 Kasboske ................... 362/543
6,443,605 B1 * 9/2002 Kasboske ................... 362/493

* cited by examiner

Primary Examiner—Stephen Husar
Assistant Examiner—Bertrand Zeade
(74) Attorney, Agent, or Firm—Wood, Phillips, Katz, Clark & Mortimer

(57) ABSTRACT

A system for mounting an object on a surface. The system has first and second supports for placement at spaced locations on a surface, and a plurality of modules that are engageable with each other and the first and second supports to define a first spanning section between the first and second supports that is spaced relative to a surface on which the first and second supports are placed.

25 Claims, 10 Drawing Sheets

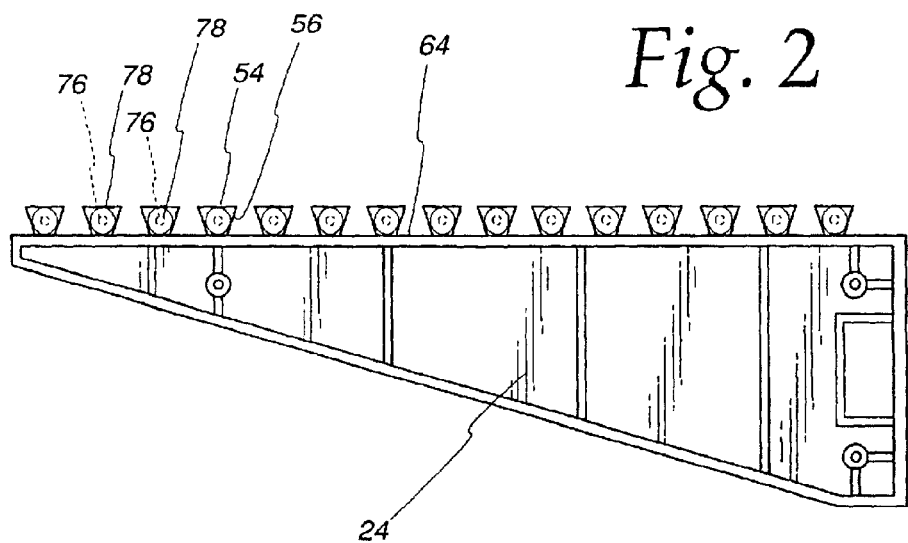
Fig. 2
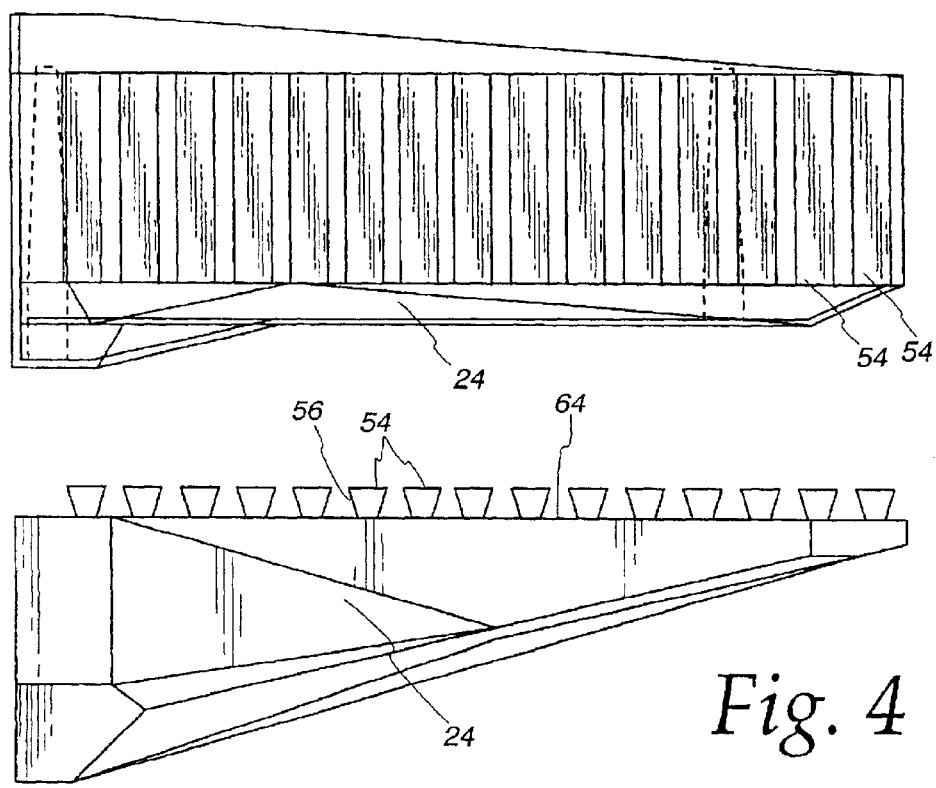
Fig. 3
Fig. 4

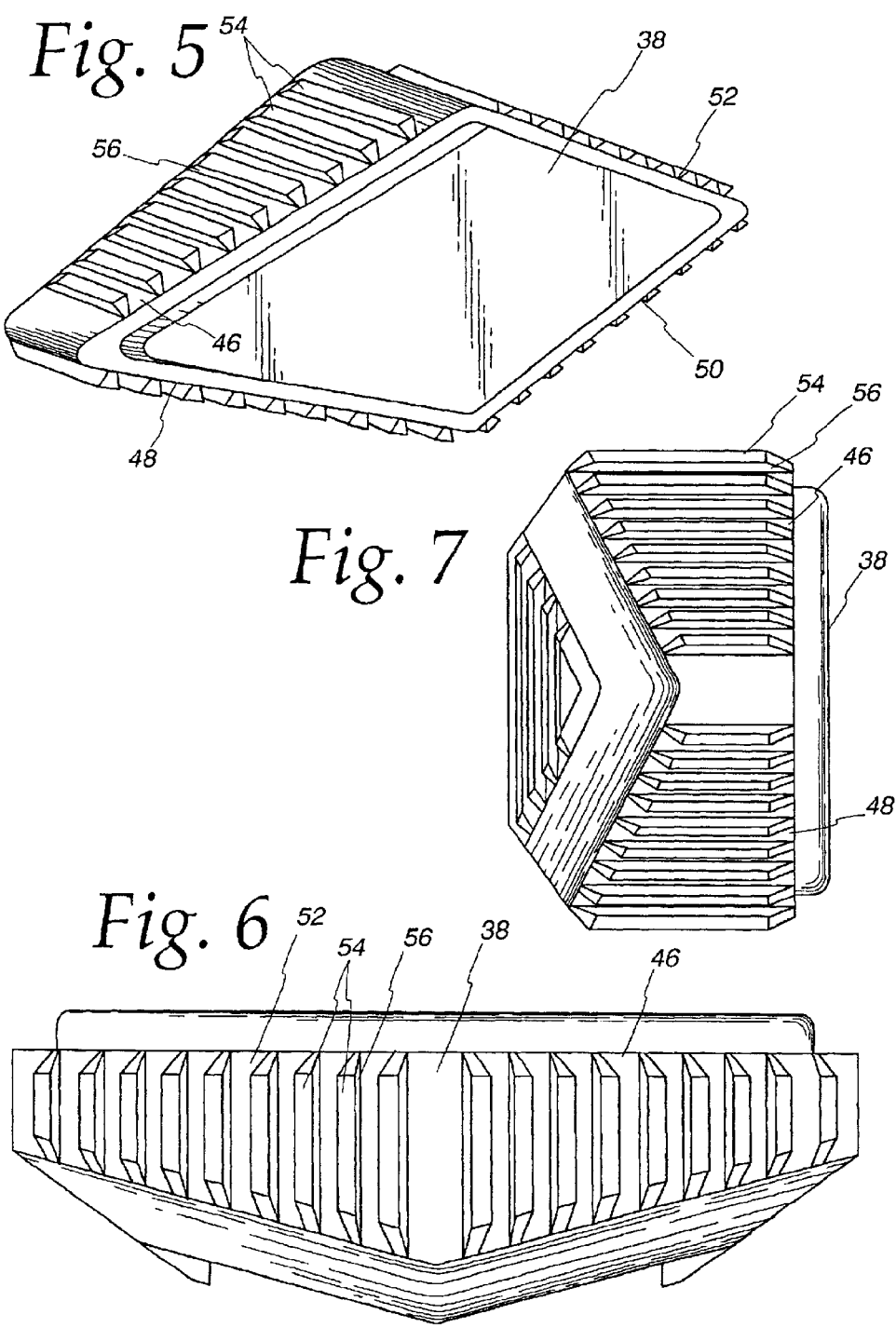

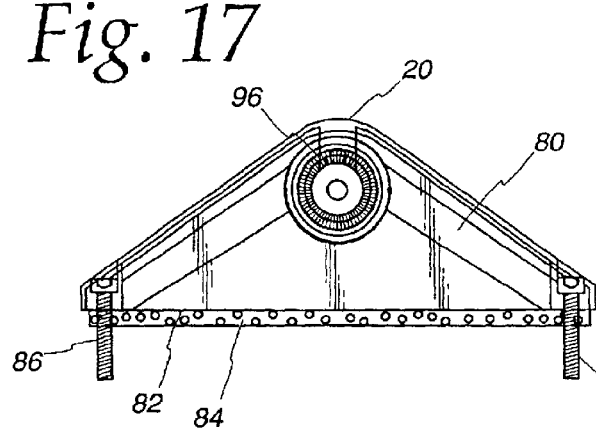
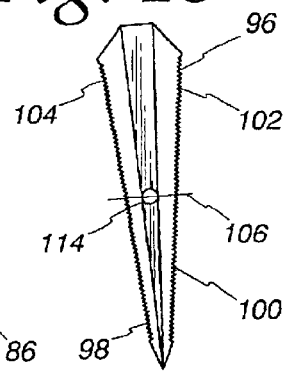
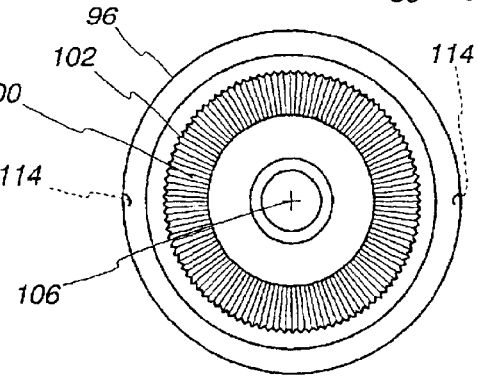
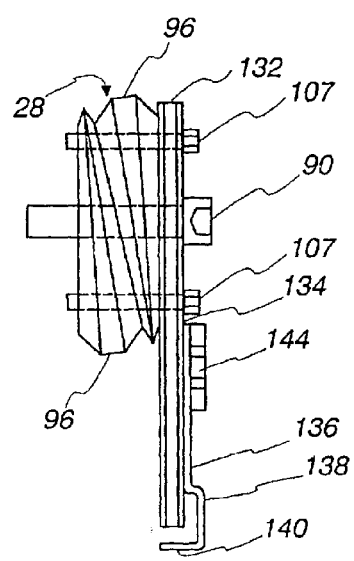
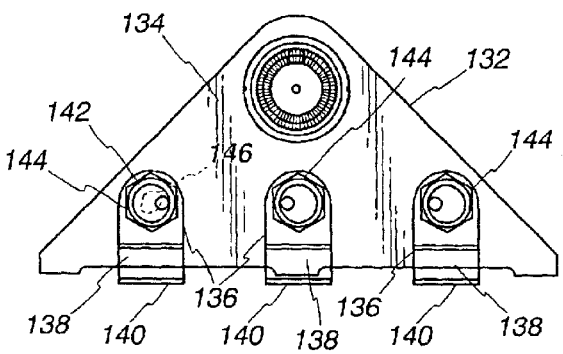

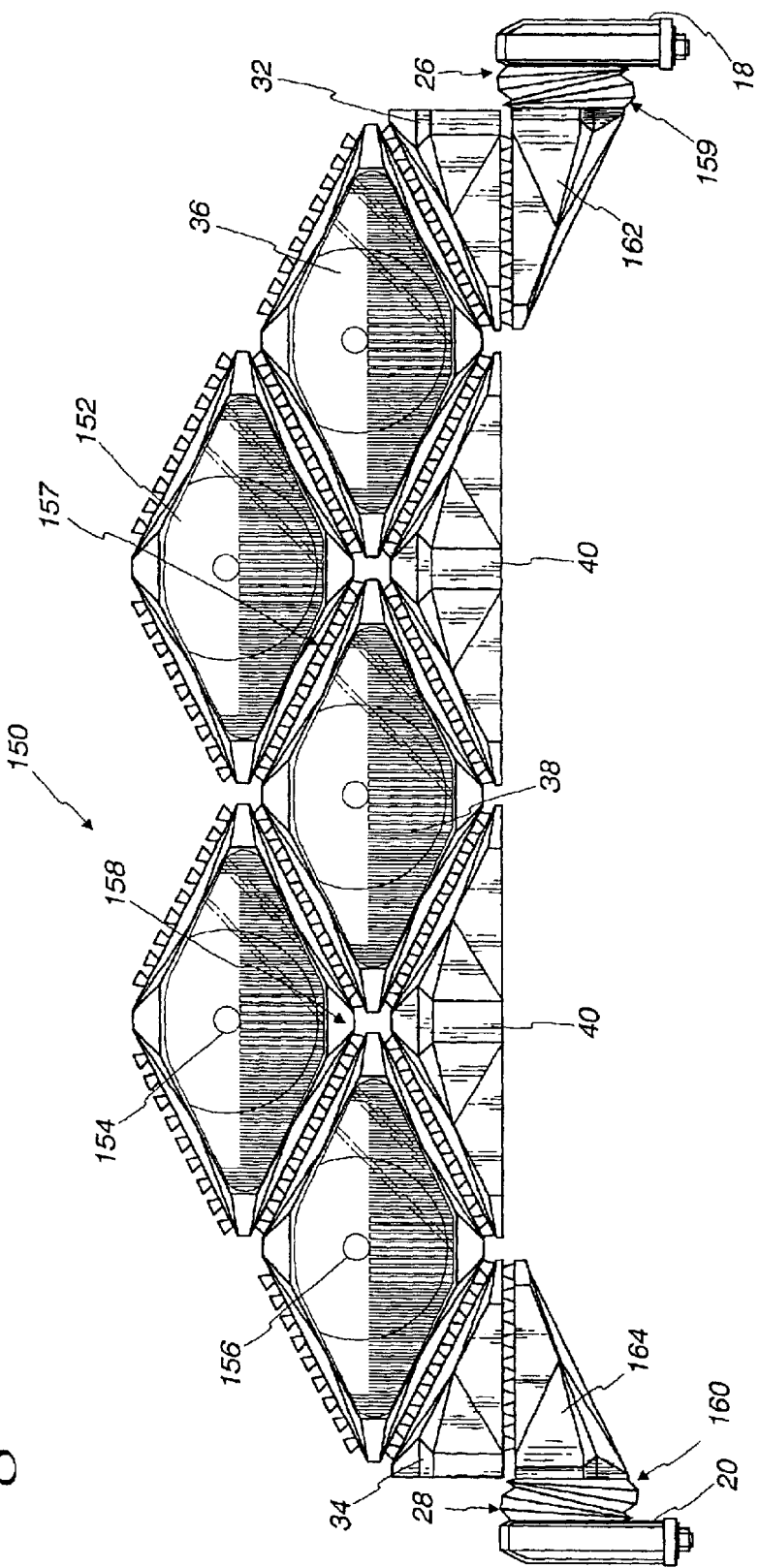

SYSTEM FOR MOUNTING AN OBJECT ON A MOVING VEHICLE

BACKGROUND OF THE INVENTION

1. Field of the Invention

This invention relates to a mounting system that is particularly adaptable to mounting objects on a surface of a moving vehicle, such as an automotive vehicle.

2. Background Art

Mounting systems are used in the automotive industry to perform a wide range of tasks. One exemplary system of this type is used to mount running lights, such as on a pickup truck cab, or elsewhere. These types of systems commonly utilize spaced supports which are mounted adjacent to the sides of the vehicle and a spanning beam which extends between the supports. One, or a plurality, of the lights are mounted on the spanning beam at a desired location thereon. It is also known to stack the individual lights, as shown for example, in my U.S. Pat. No. 6,123,441.

Generally, such systems provide an effective mount for lights and permit unique arrangements thereof. However, the spanning beam which supports the light may be relatively unsightly. Additionally, the spanning beam is normally constructed to be dedicated to the support of a single type of object, such as the light sources.

Similarly, mounting systems for other types of objects on automotive vehicles are generally one-dimensional in function. Thus, if a number of different objects are to be mounted upon an automotive vehicle, generally a like number of mounting systems are required to be kept on hand.

Those systems that are dedicated to a particular function may have other significant drawbacks. For example, a number of mounting systems are designed to support elongate objects from automotive vehicles by placing a pair of the aforementioned spanning beams at locations spaced in a fore-and-aft direction. The elongate objects are placed so as to bridge the spanning beams. Suitable tie-downs are used to maintain the object against the mounting system. Generally, the beams have flat support surfaces which bear upon the objects to be carried. Consequently, there may be a tendency of the mounted objects to slide along the beams in both fore-and-aft and side-to-side directions. Great care may have to be taken to keep the object in the desired location and securely in place so that it will not shift on, or separate from, the vehicle.

SUMMARY OF THE INVENTION

In one form, the invention is directed to a system for mounting an object on a surface of a vehicle. The system has first and second supports for placement at spaced locations on a surface of the vehicle, and a plurality of modules that are engageable with each other and the first and second supports to define a first spanning section, between the first and second supports, that is spaced relative to a surface on which the first and second supports are placed.

In one form, a first module is engageable with the first support, a second module is engageable with the second support, and the first and second modules are engageable, directly or indirectly, with each other through at least one additional module to define the first spanning section.

In one form, one of the modules has a source of illumination thereon.

The plurality of modules may be releasably engageable with each other and the first and second supports.

In one form, the first support has a cantilevered platform and a first module is engageable with the cantilevered platform.

In one form, the first spanning section is moveable as a unit relative to part of each of the first and second supports.

In one form, the first spanning section extends along a first line and the cantilevered platform is selectively moveable in opposite directions along a line generally parallel to the first line.

In one form, the first spanning section extends along a first line between the first and second supports, with the first line residing in a horizontal plane. The first and second modules each have a substantially straight side. The straight sides are substantially parallel to each other and engage each other so that the straight sides extend at an angle to the horizontal plane.

In one form, two of the modules are engageable by movement, one relative to the other, along a second line that is transverse to the first line.

The first module may have an elongate first rib with a length extending substantially parallel to the second line, with the second module having a first receptacle for receiving the first rib and guiding the first rib along the second module and parallel to the second line.

A second rib may be provided on one of a third module and the first support, with a receptacle for receiving the second rib provided on the other of the third module and the first support. The second receptacle guides the second rib along the other of the third module and the first support parallel to the second line.

In one form, a first module has an inverted V shape defined by first and second angled surfaces, with the first angled surface engaging a surface on a second module and the second angled surface engaging a surface on a third module.

In one form, the first spanning section is not supported between the first and second supports from a surface of a moving vehicle on which the first and second supports are placed.

In one form, the mounting system further includes third and fourth supports for placement at spaced locations on a surface of a vehicle and a second spanning section extending between the third and fourth supports. An object to be mounted can be extended across the first and second spanning sections to be supported cooperatively by the first and second spanning sections.

The invention is further directed to a system for mounting an object on a surface, which system has first and second supports for placement at spaced locations on a surface, and a plurality of modules that are engageable with each other and the first and second supports to define a first spanning section between the first and second supports that is spaced relative to a surface on which the first and second supports are placed.

This system may further include third and fourth supports for placement at spaced locations on a surface, and a second spanning section extending between the third and fourth supports, whereby an object to be mounted can be extended across the first and second spanning sections to be supported cooperatively by the first and second spanning sections.

The first and second modules may be press-fit together by relative movement along a line.

In one form, at least one of the modules and the first support can be press-fit together by relative movement along a line.

The spanning section may be unsupported between the first and second supports.

The invention is further directed to a method of mounting an object on a surface. The method includes the steps of: placing first and second supports on the surface at spaced locations; press-fitting at least a first module to the first and second supports so that the at least first module defines a first spanning section that extends between the first and second supports and is unsupported by the surface between the first and second supports; and supporting the object through the spanning section.

The object may define one of the plurality of modules.

The method may further include the steps of placing third and fourth supports on a surface at spaced locations, placing a second spanning section between the third and fourth supports, and supporting the object cooperatively between the first and second spanning sections.

In one form, the object has an illumination source thereon.

The method may include the step of press-fitting at least two of the modules together to define the first spanning section.

The method may include the step of adjusting the first spanning section, as a unit, relative to the first and second supports.

BRIEF DESCRIPTION OF THE DRAWINGS

FIG. 2 is an enlarged, rear elevation view of a platform element on one of the supports;

FIG. 3 is an enlarged, plan view of the platform element in FIG. 2;

FIG. 4 is an enlarged, front elevation view of the platform element in FIGS. 2 and 3;

FIG. 5 is an enlarged, perspective view of one of the illuminating modules on the system of FIG. 1;

FIG. 6 is an enlarged, plan view of the illuminating module of FIG. 5;

FIG. 7 is an enlarged, side elevation view of the illuminating module in FIGS. 5 and 6;

FIG. 17 is a side elevation view of an upright on one of the supports on the mounting system of FIG. 1;

FIG. 18 is an enlarged, front elevation view of a disk/cam element that is part of an adjusting assembly for the platform elements on the mounting system of FIG. 1;

FIG. 19 is an enlarged, side elevation view of the disk/cam element of FIG. 18;

FIG. 20 is a view as in FIG. 17 of a modified form of upright, according to the present invention;

FIG. 21 is an enlarged, front elevation view of the upright in FIG. 20;

FIG. 22 is a front elevation view of a modified form of system for mounting an object, according to the present invention;

DETAILED DESCRIPTION OF THE DRAWINGS

Figure 1:
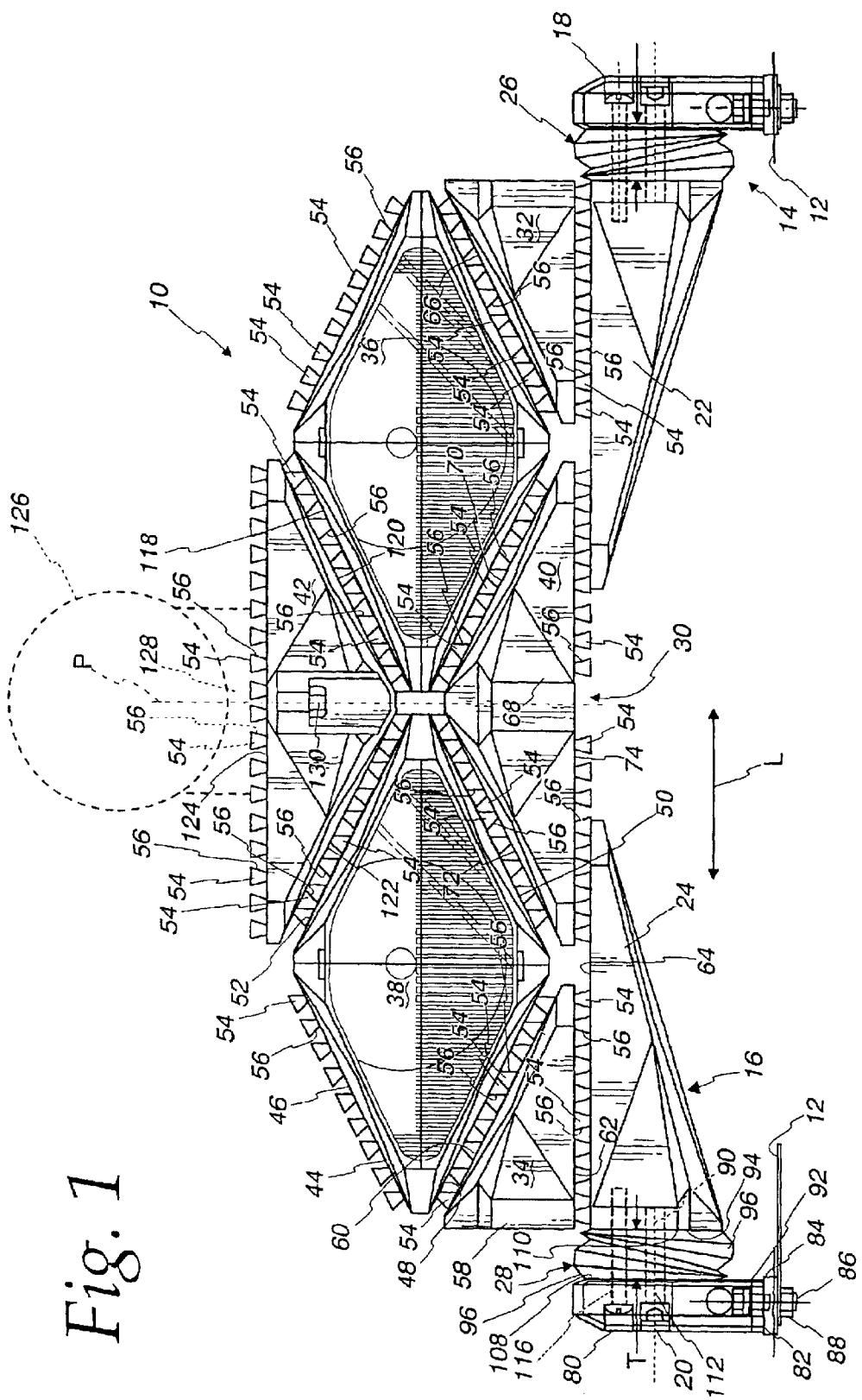
FIG. 1 is a front elevation view of a system for mounting an object, according to the present invention, and consisting of laterally spaced supports, two illuminating modules, and a connecting/adaptor module.

Referring initially to FIGS. 1–19, one form of system for mounting an object, according to the present invention, is shown at 10. As shown in FIG. 1, the system 10 is mounted on a surface 12, which may be, for example, an upwardly facing surface on a vehicle, such as a car, truck or an off-road vehicle. The vehicle may be self-propelled, as described, or may be in the form of a trailer that is drawn by another vehicle. Moreover, the invention has utility in environments other than the moving vehicle environment.

The system 10 includes first and second supports 14, 16, each having the same construction and placed at spaced locations on the surface 12. The supports 14, 16 have uprights 18, 20 from which cantilevered platforms 22, 24 project. Adjusting assemblies 26, 28 reside between the uprights 18, 20 and platforms 22, 24, and selectively permit both angular reorientation of the platforms 22, 24 and shifting of the platforms 22, 24 back and forth along a line L between the uprights 18, 20, as hereinafter described.

A spanning section 30 is defined between the supports 14, 16 and consists of at least one, and in this case a plurality of, modules 32, 34, 36, 38, 40, 42 to engage with each other and the supports 14, 16. In this embodiment, the objects mounted on the system 10 are in fact the modules 36, 38, which are illumination sources/lighting modules. The lighting modules 36, 38 perform a dual purpose, i. e., they function as connecting modules and as illumination sources. The modules 32, 34, 40 are strictly connecting modules. The module 42 is a connecting/adaptor module which is optional and potentially supports additional objects, as hereinafter described.

The platforms 22, 24 and modules 32, 34, 36, 38, 40, 42 are releasably engageable with each other through dovetail connections, of the type disclosed in my U.S. Pat. No. 4,972,301, which is incorporated herein by reference. Briefly, exemplary lighting module 38 has a housing 44 with four straight sides 46, 48, 50, 52 which cooperatively define a diamond shape. At each side 46, 48, 50, 52 are a plurality of ribs/rails 54 extending generally orthogonally to the reference line L extending between the supports 14, 16. The ribs/rails 54, as viewed from their ends, each have a bilaterally symmetrical trapezoidal shape. Between adjacent ribs/rails 54 are correspondingly shaped, but inverted, guide slots/receptacles 56 for receiving the ribs/rails 54 on an adjoining module. There is a like arrangement of alternating ribs/rails 54 and guide slots/receptacles 56 on each of the sides 46, 48, 50, 52. There is a similar arrangement of ribs/rails 54 and guide slots/receptacles 56 on each of the platforms 22, 24 and on the sides of the modules 32, 34, 36, 38, 40, 42 that engage other modules.

The arrangement of the ribs/rails 54 and guide slots/receptacles 56 allows the supports 14, 16 and modules 32, 34, 36, 38, 40, 42 to be operatively connected by aligning the ribs/rails 54 with the guide slots/receptacles 56 and effecting relative guided movement of the modules in a line orthogonal to the line L. Exemplary connections between the platforms 22, 24 and modules 32, 34, 36, 38, 40, 42 will now be described.

The connecting module 34 has a housing 58 with straight sides 60, 62 having the rib/rails 54 and guide slots/receptacles 56 spaced therealong as previously described. The ribs/rails 54 on the side 62 mesh with ribs/rails 54 on a straight side 64 of the platform 24. Ribs/rails 54 on the side 60 of the connecting module 34 mesh with ribs/rails 54 on the side 48 of the lighting module 38.

The connecting module 40 has a housing 68 with straight sides 70, 72, 74 which cooperatively define a triangular shape. The ribs/rails 54 on the side 72 of the connecting module 40 mesh with the ribs/rails 54 on the side 50 of the lighting module 38. The ribs/rails 54 on the side 70 of the connecting module 40 mesh with ribs/rails 54 on the lighting module 36. The ribs/rails 54 on the side 74 of the connecting module 40 mesh with ribs/rails 54 on the side 64 of the platform 24 and correspondingly located ribs/rails 54 on the platform 22.

The lighting system 10 is symmetrical above a central, fore-and-aft plane P (FIG. 1). The structure on the right side of the plane P in FIG. 1 is a mirror image of that on the left side of the plane P. The connections between the modules 32, 36, 40, 42 and platform 22 are made in the same manner as forth corresponding elements, as described above. Of course, the shape, size, and number of the ribs/rails 54 can vary significantly from what is disclosed herein.

As shown in FIGS. 2, 8, 11 and 16, the ribs/rails 54 each have a blind bore to receive a tapered, threaded element 78 which is directed, preferably from back to rear within the bore 76, to forcibly expand the ribs/rails 54 within the guide slots/receptacles 56. With the meshing relationship between the ribs/rails 54 on the cooperating modules 32, 34, 36, 38, 40, 42 and supports 14, 16 established, expansion of the ribs/rails 54, through the advancement of the threaded element 78, firmly locks the cooperating modules 32, 34, 36, 38, 40, 42 and supports 14, 16. The desired locking strength between meshing ribs/rails 54 dictates the number of threaded element 78 that need to be tightened and to what extent.

Exemplary upright 20 has a housing 80 with a downwardly facing surface 82 and bears on the surface 12. As shown in FIG. 17, a cushioning layer 84 can be interposed between the upright surface 82 and the support surface 12 to prevent scratching of the surface 12 by the upright 20. In this embodiment, the upright 20 is held in place by bolts 86, which extend through the surface 12 and are secured by nuts 88.

The platform 24 is maintained in an elevated position on the upright 20 by a bolt 90 which extends laterally inwardly through the upright 20 and into the platform 24.

Between a laterally inwardly facing surface 92 of the upright 20 and a laterally outwardly facing surface 94 of the platform 24, the adjusting assembly 28 is interposed. The adjusting assembly 28 corresponds to that shown in my pending U.S. application Ser. No. 09/641,008, which is incorporated herein by reference. The adjusting assembly 28 consists of a cooperating pair of disks/cam elements 96, each having a wedge shape. As seen most clearly in FIGS. 18 and 19, each disk/cam element 96 has oppositely facing cam surfaces 98, 100 with an annular arrangement of radially extending ribs 102, 104 on each surface 98, 100 around a central axis 106.

By situating two disks/cam elements 96 in coaxial relationship and abutting the ribbed surfaces 98, 100, the effective thickness of the combined disks/cam elements 96 can be varied by relatively rotating the two cooperating disks/cam elements 96 about their central axes 106, as defined by the bolt 90 projecting therethrough. By increasing the effective thickness T of the disks/cam elements 96 through this rotation, the platform 24 can be shifted to the right in FIG. 1 to accommodate different mounting environments. By reducing the thickness T, the platform 24 shifts toward the upright 20.

The ribs 102, 104 interlock to positively hold the cooperating disks/cam elements 96 in the desired relative rotational position. Similar ribs 108, 110 may be provided on the platform surface 94 and upright surface 92 to effect a like interlock with the disks/cam elements 96. By tightening the bolt 90, the relative positions of the platform 24, disks/cam elements 96, and upright 20 can be fixed. By loosening the bolt 90, and the corresponding bolt associated with the first support 14, the entire spanning section 30 can be pivoted as a unit around the axis 112 of the bolt 90, which axis 112 coincides with the disk/cam axes 106.

Strategically placed marks 114 may be provided on the disks/cam elements 96 to allow visual identification of the relative positions of the disks/cam elements 96, and thus their combined effective thickness T.

A locking bolt 116 can be directed through the upright 20 into the platform 24, at a location offset from the axis 112 of the bolt 90, to ensure that the spanning section 30 is not inadvertently pivoted about the axis 112 from the desired orientation.

With the mounting system 10, as just described, the first and second supports 14, 16 can be suitably mounted to the surface 12 after which the adjusting assemblies 26, 28 are set to position the platforms 22, 24 at the desired lateral spacing. The connecting modules 32, 34 are then press-fit to the platforms 22, 24 after which the lighting modules 36, 38 are press-fit to the connecting modules 32, 34 and the connecting module 40, with the connecting module 40 being also connected to the platforms 22, 24. Of course, the order of press-fitting is not important and can be changed from that just described. Through the threaded elements 78, the connections can be positively maintained. The orientation of the spanning section 30 can be selected and fixed through tightening of the bolts 90.

The optional connecting/adaptor module 42 is nested into a V-shaped receptacle defined by straight sides 52, 118 on the lighting modules 36, 38. Ribs/rails 54 on straight sides 120, 122 of the connecting/adaptor module 42 mesh with ribs/rails 54 on the sides 52, 118 of the lighting modules 38, 36 to permit press-fit connection between the modules 36, 38, 42.

The connecting/adaptor module 42 has a flat, horizontally extending side 124 with ribs/rails 54 projecting therefrom in between which define guide slots/receptacles 56.

In this embodiment, an object 126, in the form of a round illumination source, is mounted at the side 124 of the connecting/adaptor module 42. The object 126 has a base 128 with ribs/rails 54 and guide slots/receptacles 56 therebetween. The ribs/rails 54 on the base 128 mesh with the ribs/rails 54 on the connecting/adaptor module 42. A bolt 130 can be used to positively hold the base 128 at the desired location upon the connecting/adaptor module 42. The bolt 130 may be used to maintain any desired object at the side 124 with or without the use of meshing ribs/rails 54. It should also be understood that virtually any type of object can be used upon the connecting/adaptor module 42. The illumination source 126 is intended only to be exemplary of such an object. An ornament or some other functional object or objects may be mounted upon the connecting/adaptor module 42. The object may or may not have meshing ribs/rails 54 to attach to those on the connecting/adaptor module 42.

Several variations of the inventive mounting system 10 are contemplated. In FIGS. 20 and 21, an upright 132, corresponding to the upright 20, is shown with a housing 134 with a series of adjustable clips 136 thereon. Each clip 136 has a depending element 138 with an offset free end 140 which can be directed under a gutter element as is commonly provided on a roof of a pickup truck. Each clip 136 has an associated bolt 142 with a hexagonal head 144 that is engageable by a wrench to effect turning thereof. Each bolt 142 has an eccentric shaft 146 which cams the element 138 upwardly upon being rotated in one direction to cause the end 140 to be drawn up against the gutter element to effect securing of the upright 132.

One or more optional locking bolts 107 (FIG. 21) can be directed through the mated disks/cam elements 96 to maintain the disks/cam elements 96 in the desired relative rotational position around the central axis 106 defined by the bolt 90. By directing the bolts 107 also through the upright 132, the rotational position of the disks/cam elements 96 can be fixed. The bolts 107 rigidify the connection of modules to the vehicle and prevent unwanted pivoting thereof around the bolt 90 relative to the vehicle. The bolts 107 can be accommodated by pre-formed bores or bores drilled after a desired relationship of parts is established.

Another modified form and system for mounting an object, according to the present invention, is shown at 150 in FIG. 22. The system 150 is similar to the system 10 but incorporates three additional lighting modules 152, 154, 156. The connecting adaptor 40 is utilized to connect the lighting modules 36, 38, as previously described. A like connecting module 40 connects between the modules 38, 156 in the same manner. In place of the connecting/adaptor module 42, the lighting module 152 is nested in an upwardly opening V-shaped seat 157 defined by the lighting modules 38. The lighting module 154 is nested in an upwardly opening V-shaped seat 158 defined by the lighting modules 38, 156.

Connecting modules 32, 34 are used as in the system 10 and connect to the sidemost lighting modules 36, 156.

In this embodiment, there is a slight modification in supports 159, 160, corresponding to the first and second supports 14, 16. The uprights 18, 20 and adjusting assemblies 26, 28 are the same as those previously described. However, the platforms 162, 164 do not extend laterally beyond the connecting modules 32, 34 so as to be engaged with the connecting modules 40.

It should be understood that the modules described above and modules having other configurations, can be mixed and matched to produce a desired overall look and function. The press-fit connection between modules facilitates assembly with a virtually limitless number of combinations of modules being possible. Selection of module size type, and connection makes possible a virtually limitless number of designs.

Figure 23:
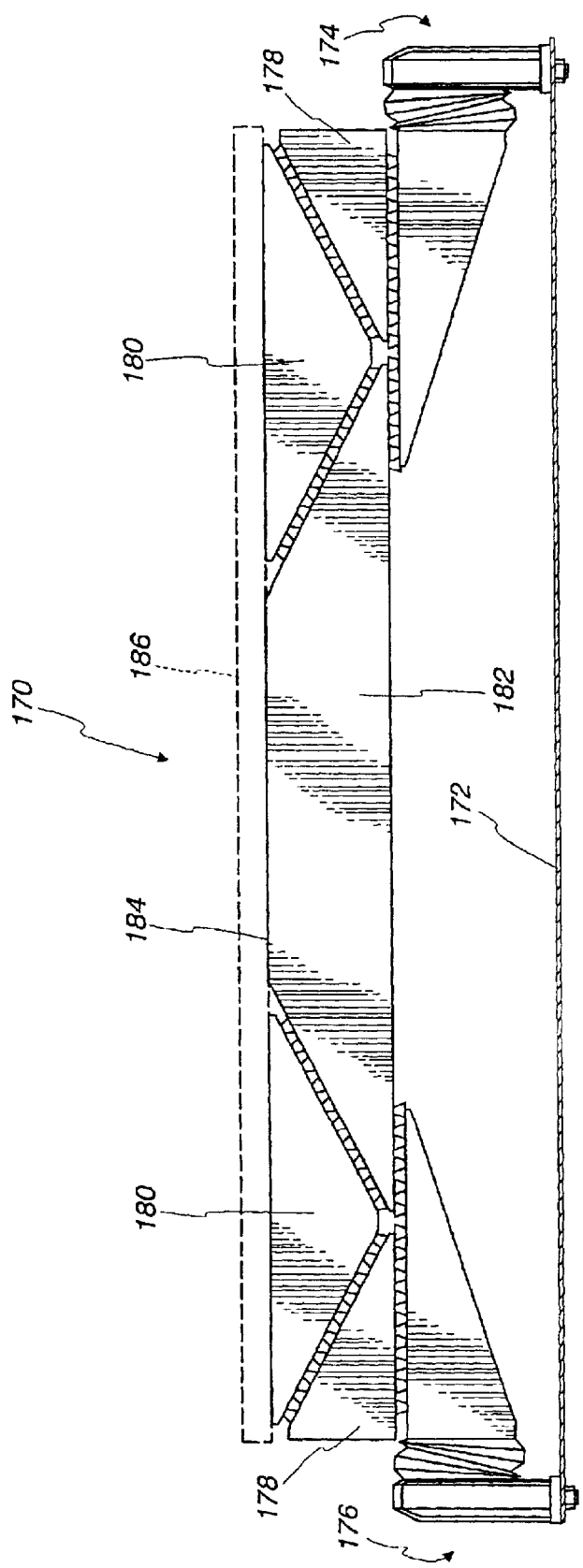
FIG. 23 is a front elevation view of a further modified form of mounting system for mounting an object, according to the present invention.

In FIG. 23, a modified form of mounting system is shown at 170, for placement on a surface 172, which may be on an automobile or in virtually any other environment. First and second supports 174, 176, as previously described, are utilized in conjunction with a plurality of modules 178, 180, 182 which are interengaged as shown using the ribs/rails 54, as described above, so that the modules 180, 182 cooperatively produce a spanning section with a straight side 184 that is horizontally oriented to support an object 186 that may be placed thereagainst. The modules 178, 180, 182 are shown to be strictly structural elements without any function apart from producing a sturdy support side 184. The object 186 may take any form and may be, as just examples, part of a ski rack, an object that is to be transported, etc.

Figure 24:
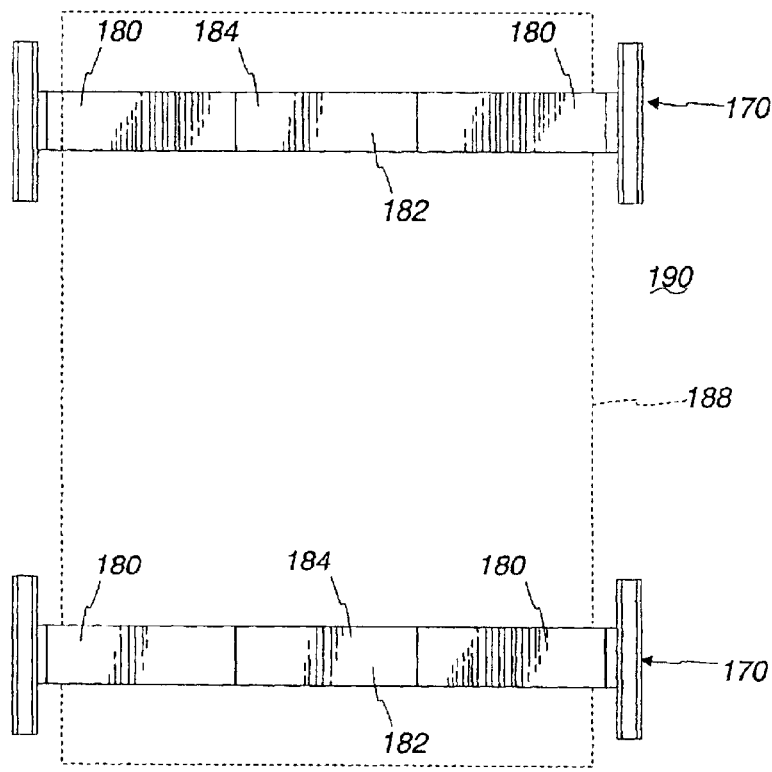
FIG. 24 is a plan view of a system, according to the invention, and consisting of two of the systems shown in FIG. 23, for cooperatively supporting an object.

In FIG. 24, two of the mounting systems 170 are shown in spaced relationship on a surface 190. The object 188 can be oriented so as to bridge the sides 184. As just one example, the object 188 might be an elongate board, skis, a cargo container, etc. to be transported by a vehicle to which the mounting system 170 is attached.

Figure 25:
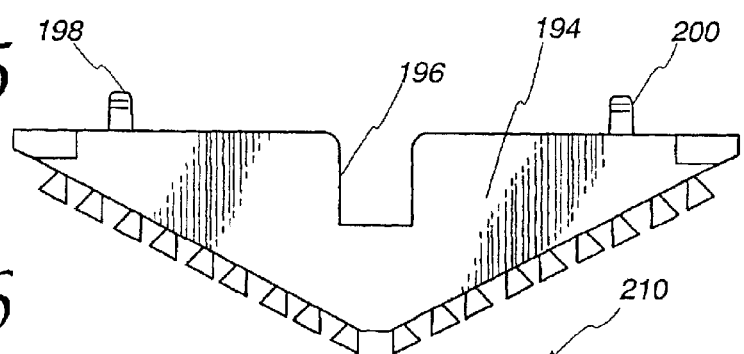
FIG. 25 is an enlarged, front elevation view of a module having a receptacle and tie-downs for holding an object and connectable as to the mounting system in FIGS. 1, 22, and 23.

A further modification, according to the present invention, is shown in FIG. 25. In FIG. 25, a module 194, having the configuration of the previously connecting/adaptor module 42, is provided and has a receptacle 196 formed therein, as for reception of an object, which might be the keel of a boat, a bicycle tire, etc. Tie-down loops 198, 200 are provided to maintain a part of the object in the receptacle 196. The module 194 can be preliminarily attached to the object and then assembled to the remainder of the mounting system or assembled to the mounting system after which the object is put in place.

Figure 26:
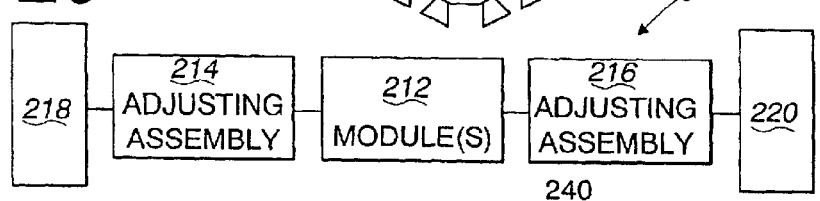
FIG. 26 is a schematic representation of a system for mounting an object as in FIGS. 1, 22 and 23, which is mounted to/between surfaces.

In FIG. 26, a generic form of the inventive mounting system is shown at 210 with a one or more modules 212 between adjusting assemblies 214, 216. This entire system 210 is captive between facing surfaces 218, 220, which may be on a push bar assembly on a truck or any other structure with facing mounting surfaces. The adjusting assemblies 214, 216 can be manipulated to maintain the mounting system 210 under pressure wedged between the surfaces 218, 220.

In the event that one or more of the modules has an illumination source, the vehicle mounting location can be virtually anywhere on the vehicle and for any purpose. As just examples, the illumination module(s) may be mounted on a light bar, a roll bar, a bumper, a roof, a gutter mounted roof rack, or another accessory such as a mirror, or the like, or on a side of the vehicle, such as on a door, a box, etc. The light may be projected in any direction, i.e. forwardly, rearwardly or sideways, and may be functional, such as illumination sources in the form of headlights, driving lights, spot lights, flood lights, running lights, side marker lights, brake lights, turn signal lights, emergency lights, etc.

Figure 8:
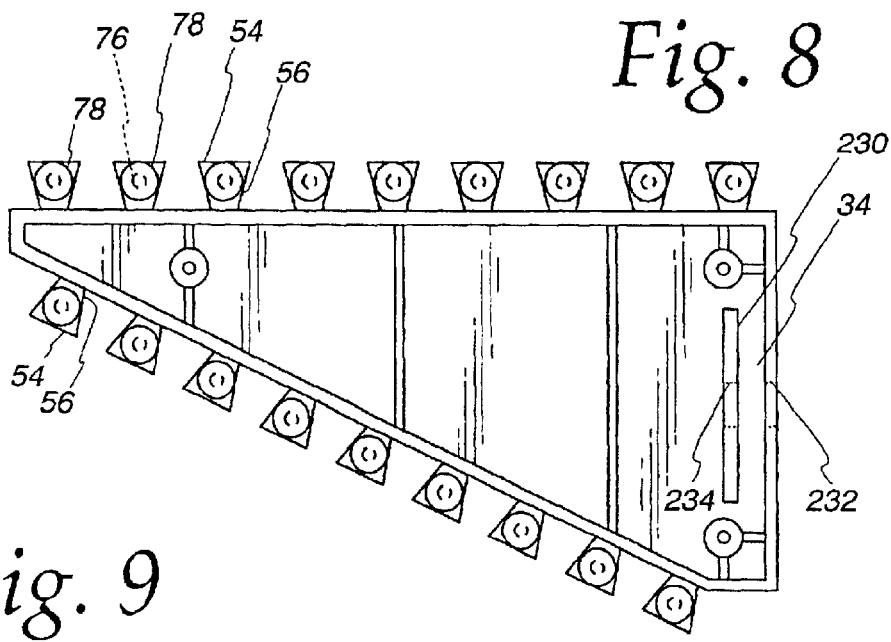
FIG. 8 is an enlarged, rear elevation view of one of the modules in FIG. 1 which connects between the illuminating module in FIGS. 507 and platform element in FIGS. 2–4.
Figure 9:
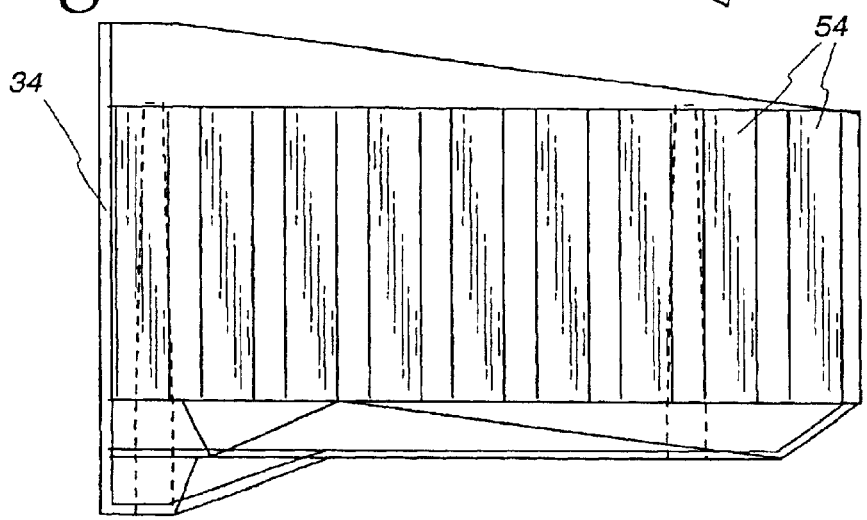
FIG. 9 is an enlarged, plan view of the connecting module of FIG. 8.
Figure 10:
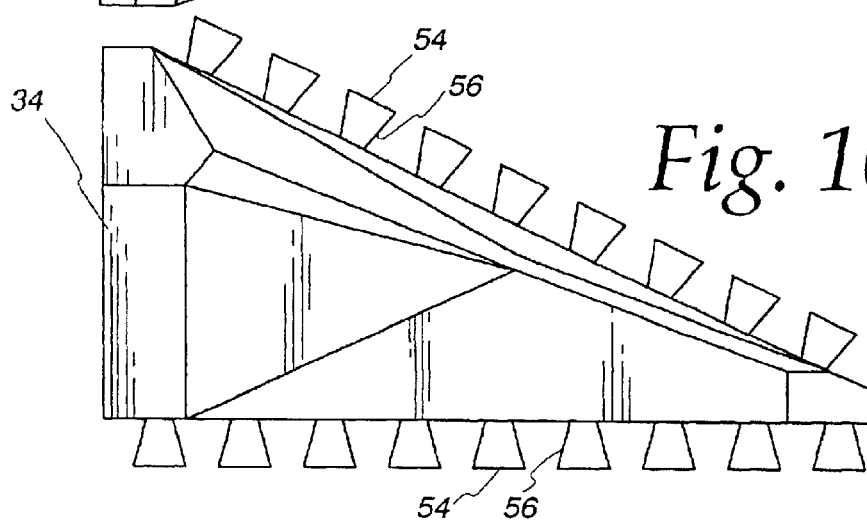
FIG. 10 is an enlarged, front elevation view of the connecting module of FIGS. 8 and 9.
Figure 11:
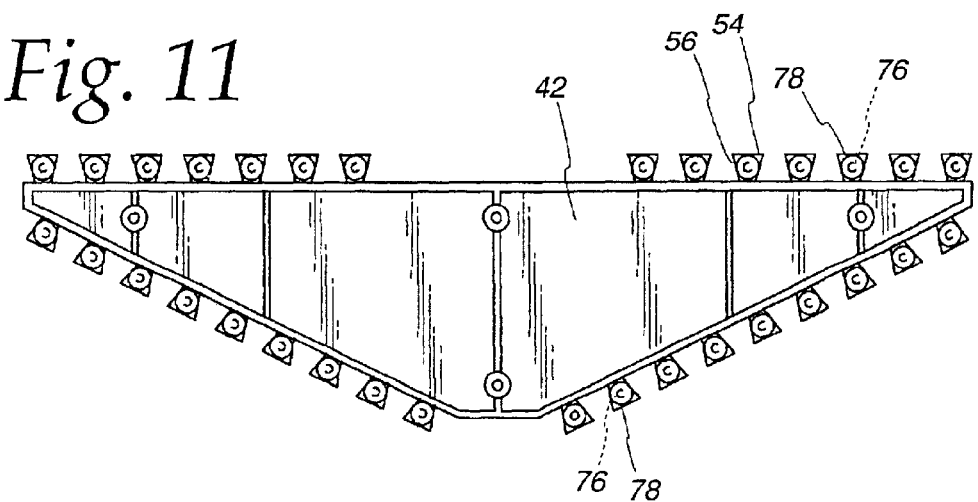
FIG. 11 is an enlarged, rear elevation view of one of the modules in FIG. 1 which connects between the two illuminating modules, at the top thereof, and platform elements on the supports.
Figure 12:
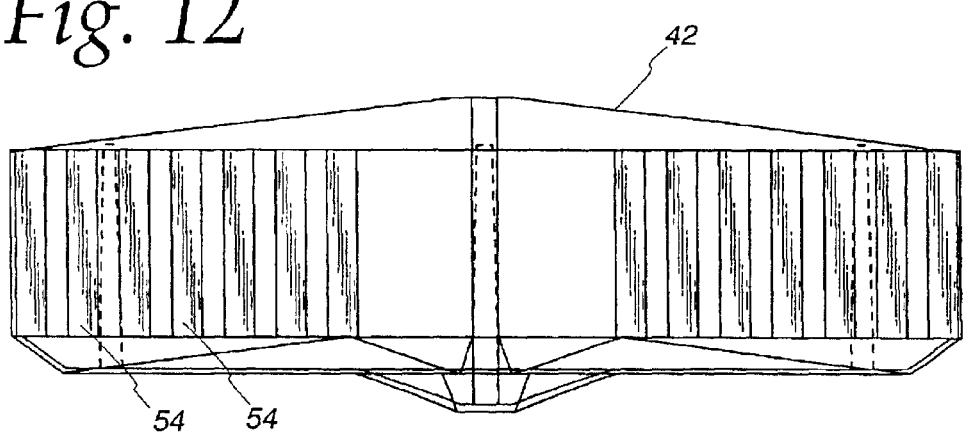
FIG. 12 is an enlarged, plan view of the connecting module of FIG. 11.
Figure 13:
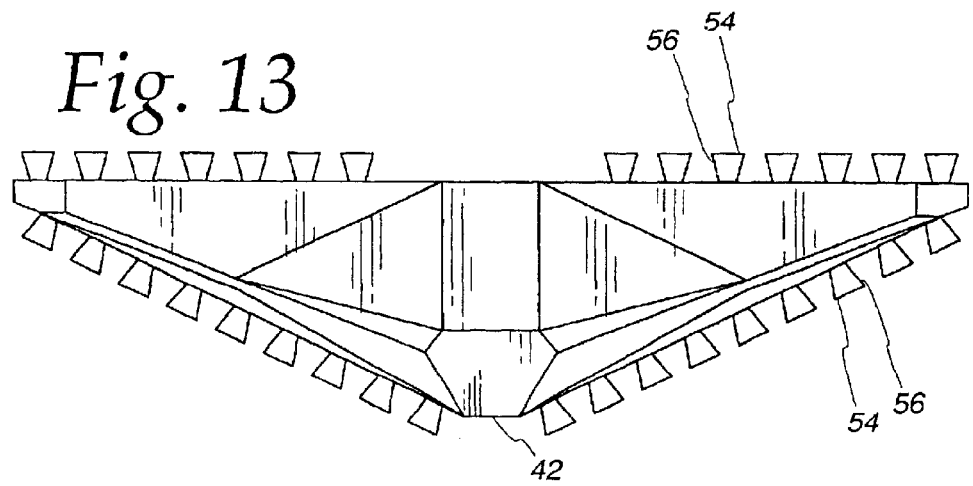
FIG. 13 is an enlarged, front elevation view of the connecting module in FIGS. 11 and 12.
Figure 14:
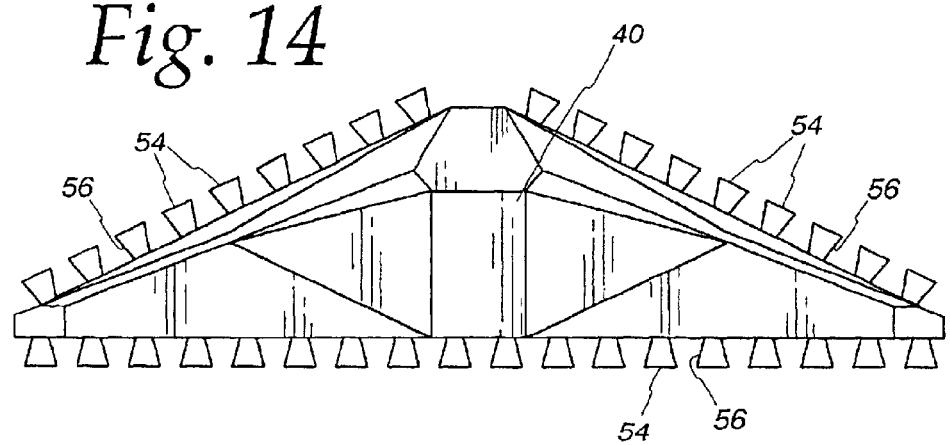
FIG. 14 is an enlarged, front elevation view of one of the modules in FIG. 1 which connects between the two illuminating modules, at the bottom thereof, and is usable as an adaptor to support an object on the mounting system in FIG. 1.
Figure 15:
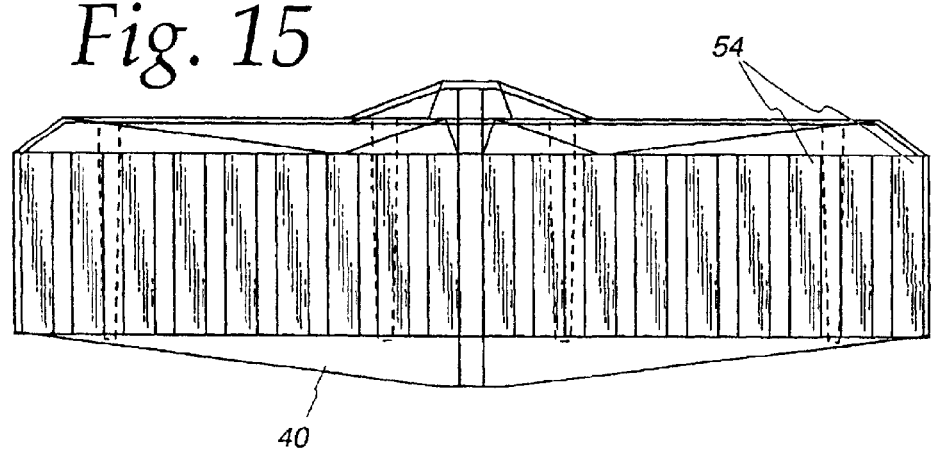
FIG. 15 is an enlarged, plan view of the connecting/adaptor module of FIG. 14.
Figure 16:
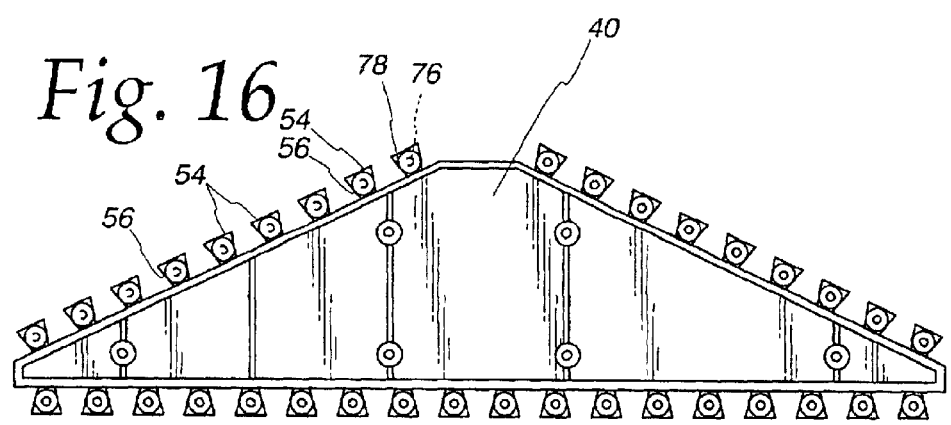
FIG. 16 is an enlarged, rear elevation view of the connecting/adaptor module of FIGS. 14 and 15.

As shown in FIG. 8, an optional anchoring plate 230 can be provided on the module 34 so that the module 34 can be mounted through the bolt 90 directly to the upright 20 without the use of the platform 24. An opening 232 accepts the bolt 90 which may be threadably engaged in a bore 234 in the anchoring plate 230. In the absence of the platform 24, the system 10 has an overall lower profile relative to the vehicle. The other platform 22 is similarly adapted to receive the bolt 90 so that the system has a level orientation.

Figure 27:
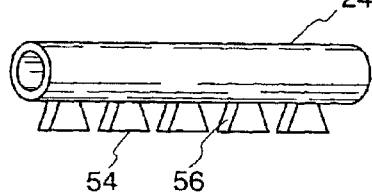
FIG. 27 is a perspective view of a conduit that can be press fit into place to route wiring.

Other types of accessories might be held in place through the system 10. For example, as shown in FIG. 27, a conduit 240 with ribs/rails 54 and slots/receptacles 56 may be press-fit to a module to receive, route, maintain the position of, and/or at least partially hide from view, electrical wiring associated with one or more modules.

Accordingly, with the inventive structure, mounting systems can be constructed using modules in the manner of joinable building blocks. Desired aesthetic and functional configurations can be generated for use on virtually any surface. However, the invention is particularly adapted for use on vehicles, including cars, off-road vehicles, trucks, trailers, etc. Virtually any type of device can be integrated into the system, such as front and rear lighting, speakers, ornaments, etc. While angled and diamond-shaped modules are shown, the modules could have other shapes, such as round, elliptical, etc.

The foregoing disclosure of specific embodiments is intended to be illustrative of the broad concepts comprehended by the invention.

What is claimed is:

1. A system for mounting an object on a surface of a vehicle, said system comprising:

first and second supports for placement at spaced locations on a surface of a vehicle; and a plurality of modules that are engageable with each other and the first and second supports to define a first spanning section between the first and second supports that is spaced relative to a surface on which the first and second supports are placed, wherein the first spanning section is pivotable as a unit relative to the first and second supports.

2. The system for mounting an object on a surface of a vehicle according to claim 1 wherein the plurality of modules comprises first and second modules, the first module engageable with the first support, the second module engageable with the second support, the first and second modules engageable indirectly with each other through at least one additional module to define the first spanning section.

3. The system for mounting an object on a surface of a vehicle according to claim 1 wherein one of the modules comprises a source of illumination.

4. The system for mounting an object on a surface of a vehicle according to claim 1 wherein the plurality of modules are releasably engageable with each other and the first and second supports.

5. The system for mounting an object on a surface of a vehicle according to claim 1 wherein the first support comprises a cantilevered platform and a first module in the plurality of modules is engageable with the cantilevered platform.

6. The system for mounting an object on a surface of a vehicle according to claim 1 wherein the first spanning section is movable as a unit relative to a part of each of the first and second supports.

7. The system for mounting an object on a surface of a vehicle according to claim 5 wherein the first spanning section extends along a first line, and the cantilevered platform is selectively movable in opposite directions along a line generally parallel to the first line.

8. The system for mounting an object on a surface of a vehicle according to claim 1 wherein the first spanning section extends along a first line between the first and second supports, the first line resides in a horizontal plane, first and second modules in the plurality of modules each have a substantially straight side, the straight sides are substantially parallel to each other and engage each other, and the straight sides on the first and second modules extend at an angle to the horizontal plane.

9. The system for mounting an object on a surface of a vehicle according to claim 1 wherein the spanning section extends along a first line between the first and second supports and first and second modules in the plurality of modules are engageable by movement one relative to the other along a second line that is transverse to the first line.

10. The system for mounting an object on a surface of a vehicle according to claim 9 wherein the first module has an elongate first rib with a length extending substantially parallel to the second line and the second module has a first receptacle for receiving the first rib and guiding the first rib along the second module parallel to the second line.

11. The system for mounting an object on a surface of a vehicle according to claim 10 wherein there is a second rib on one of a third module in the plurality of modules and the first support and a second receptacle for receiving the second rib on the other of the third module and the first support and guiding the second rib along the other of the third module and the first support parallel to the second line.

12. The system for mounting an object on a surface of a vehicle according to claim 1 wherein a first module in the plurality of modules has an inverted V shape defined by first and second angled surfaces, the first angled surface engages a surface on a second module in the plurality of modules, and the second angled surface engages a surface on a third module in the plurality of modules.

13. The system for mounting an object on a surface of a vehicle according to claim 1 wherein the first spanning section is not supported between the first and second supports from a surface of a moving vehicle on which the first and second supports are placed.

14. The system for mounting an object on a surface of a vehicle according to claim 1 further comprising second and third supports for placement at spaced locations on a surface of a vehicle and a second spanning section extending between the third and fourth supports, whereby an object to be mounted on a vehicle can be extended across the first and second spanning sections to be supported cooperatively by the first and second spanning sections.

15. A system for mounting an object on a surface, the system comprising:

first and second supports for placement at spaced locations on a surface; and a plurality of modules that are engageable with each other and the first and second supports to define a first spanning section between the first and second supports that is spaced relative to a surface on which the first and second supports are placed, the plurality of modules comprising at least first and second modules each having a width dimension extending between the first and second supports, wherein a distance between the first and second supports is at least equal to the width dimension of the first module added to the width dimension of the second module.

16. The system for mounting an object on a surface according to claim 15 further comprising third and fourth supports for placement at spaced locations on a surface, and a second spanning section extending between the third and fourth supports, whereby an object to be mounted can be extended across the first and second spanning sections to be supported cooperatively by the first and second spanning sections.

17. The system for mounting an object on a surface according to claim 15 wherein a first and second of the modules are press-fit together by relative movement along a line.

18. The system for mounting an object on a surface according to claim 15 wherein a first module and the first support are press-fit together by relative movement along a line.

19. The system for mounting an object on a surface according to claim 15 wherein the spanning section is unsupported between the first and second supports.

20. A method of mounting an object on a surface, the method comprising the steps of:

placing first and second supports on the surface at spaced locations;

press-fitting at least a first module to the first and second supports so that the at least first module defines a first spanning section that extends continuously between the first and second supports and that is unsupported by the surface between the first and second supports; and attaching the object to the spanning section to support the object at a location between the first and second supports.

21. The system for mounting an object on a surface according to claim 20 wherein the object defines one of the plurality of modules.

22. The system for mounting an object on a surface according to claim 20 further comprising the steps of placing third and fourth supports on a surface at spaced locations, placing a second spanning section between the third and fourth supports, and supporting the object cooperatively through the first and second spanning sections.

23. The system for mounting an object on a surface of a vehicle according to claim 20 wherein the object comprises an illumination source.

24. The system for mounting an object on a surface according to claim 20 further comprising the step of press-fitting at least two of the modules together to define the first spanning section.

25. The system for mounting an object on a surface according to claim 20 further comprising the steps of adjusting the first spanning section as a unit relative to the first and second supports.

* * * * *